United States Patent
Elpula et al.

(10) Patent No.: US 9,367,412 B2
(45) Date of Patent: Jun. 14, 2016

(54) NON-DISRUPTIVE CONTROLLER REPLACEMENT IN NETWORK STORAGE SYSTEMS

(75) Inventors: Sravana Kumar Elpula, Andhra Pradesh (IN); Varun Garg, Punjab (IN); Sakshi Chaitanya Veni, Kamataka (IN)

(73) Assignee: NetApp, Inc., Sunnyvale, CA (US)

( * ) Notice: Subject to any disclaimer, the term of this patent is extended or adjusted under 35 U.S.C. 154(b) by 650 days.

(21) Appl. No.: 13/532,312

(22) Filed: Jun. 25, 2012

(65) Prior Publication Data
US 2013/0346790 A1 Dec. 26, 2013

(51) Int. Cl.
G06F 11/00 (2006.01)
G06F 11/20 (2006.01)

(52) U.S. Cl.
CPC .................................. G06F 11/2092 (2013.01)

(58) Field of Classification Search
CPC ............ G06F 12/0886; G06F 12/0888; G06F 11/2092
USPC .......... 714/5.11; 711/162, 119, 111, 114, 124
See application file for complete search history.

(56) References Cited

U.S. PATENT DOCUMENTS

| | | | |
|---|---|---|---|
| 5,975,738 A | 11/1999 | DeKoning et al. | |
| 6,321,298 B1 * | 11/2001 | Hubis | 711/124 |
| 6,412,045 B1 * | 6/2002 | DeKoning et al. | 711/135 |
| 6,567,889 B1 * | 5/2003 | DeKoning | G06F 3/0601 |
| | | | 711/113 |
| 6,941,396 B1 | 9/2005 | Thorpe et al. | |
| 7,032,029 B1 | 4/2006 | Tanzman et al. | |
| 8,443,119 B1 * | 5/2013 | Limaye et al. | 710/31 |
| 2002/0035623 A1 | 3/2002 | Lawande et al. | |
| 2002/0133735 A1 * | 9/2002 | McKean et al. | 714/5 |
| 2003/0041201 A1 * | 2/2003 | Rauscher | 710/300 |
| 2003/0051098 A1 * | 3/2003 | Brant et al. | 711/114 |
| 2003/0188233 A1 * | 10/2003 | Lubbers et al. | 714/100 |
| 2005/0099766 A1 * | 5/2005 | Fraley | G11B 27/36 |
| | | | 361/679.33 |
| 2008/0005614 A1 * | 1/2008 | Lubbers et al. | 714/11 |
| 2008/0016301 A1 * | 1/2008 | Chen | 711/162 |
| 2009/0319724 A1 * | 12/2009 | Oe et al. | 711/113 |
| 2010/0250700 A1 | 9/2010 | O'Brien et al. | |

(Continued)

OTHER PUBLICATIONS

Wollongong, "Data ONTAP 7.3 Active /Active Cofiguration" Jun. 2008, University of Wollongong, pp. 1-188.*

(Continued)

Primary Examiner — Bryce Bonzo
Assistant Examiner — Jeison C Arcos
(74) Attorney, Agent, or Firm — LeClairRyan, a Professional Corporation

(57) ABSTRACT

A network-based storage system includes multiple storage devices and system controllers. Each storage device in multiple aggregates of storage devices can include ownership portion(s) that are configured to indicate a system controller to which it belongs. First and second system controllers can form an HA pair, and can be in communication with each other, the storage devices, and a separate host server. A first system controller controls an aggregate of storage devices and can facilitate an automated hotswap replacement of a second system controller that controls another aggregate of storage devices with a separate third system controller that subsequently controls the other aggregate of storage devices. The first system controller can take over control of the second aggregate of storage devices during the automated hotswap replacement of the second system controller, and can exchange system identifiers and ownership portion information with the separate third system controller automatically during the hotswap.

18 Claims, 6 Drawing Sheets

(56) References Cited

U.S. PATENT DOCUMENTS

| | | |
|---|---|---|
| 2011/0153905 A1 | 6/2011 | Otani et al. |
| 2011/0231602 A1 | 9/2011 | Woods et al. |
| 2013/0067569 A1* | 3/2013 | Rizzo et al. ............... 726/21 |
| 2014/0229676 A1* | 8/2014 | Biswas et al. ............. 711/119 |

OTHER PUBLICATIONS

NetApp, "Replacing a controller module in a 20xx system" Nov. 2010, NetApp, pp. 1-20.*

NetApp, "Replacing a controller module in a 2240 system" Oct. 2011, NetApp, pp. 1-24.*

NetApp, "Clusted Data ONTAP 8.2" May 2013, NetApp, pp. 1-108.*

Charlotte Brooks, "Data ONTAP 8.1 Operating in Cluster-Mode: An Introduction," Technical Report, NetApp, Inc., Sep. 2011 / TR-3982, 11 pages.

Patent Cooperation Treaty—International Searching Authority—US, PCT Notification of Transmittal of the International Search Report and the Written Opinion of the International Searching Authority, or the Declaration, Application No. PCT/US2013/047335, mailed Feb. 7, 2014, 10 pages, Alexandria, Virginia.

International Preliminary Report on Patentability for Application No. PCT/US2013/047335 mailed on Dec. 31, 2014, 8 pages.

Supplementary European Search Report for Application No. EP13810539 mailed on Dec. 9, 2015, 7 pages.

* cited by examiner

NON-DISRUPTIVE CONTROLLER REPLACEMENT IN NETWORK STORAGE SYSTEMS

TECHNICAL FIELD

The present disclosure relates generally to network storage systems, and more particularly to the replacement of controllers on network storage systems.

BACKGROUND

A storage area network ("SAN") environment often includes numerous storage devices that are operated by using a dual controller model. In many cases such storage devices can include at least one array of disks, which can be classified as a redundant array of independent disks ("RAID"). Under such dual controller model arrangements, where the controllers are often referred to as High Availability ("HA") pairs, individual controllers can be assigned to operate as primary controllers or "owners" of various volumes or arrays of storage devices. These controllers can also take over volumes of storage devices from their alternate or paired controllers in the case of failures or other reasons for replacing controllers.

The replacement or swapping out of system controllers in HA pairs is generally well known, and typically involves the replacement of controller heads, NVRAM cards, and/or the entire controller in some instances. Such procedures are sometimes referred to as "headswap," and often result in significant disruption to the overall operation of at least the HA pair and RAIDS assigned thereto, if not the larger SAN to which the HA and RAIDs may belong. For example, a common approach to headswap involves booting the controller affected by the swap into a maintenance mode and running a disk reassign operation. While effective, this is disruptive in that the storage owned by the affected controller is generally unavailable during the process.

Other approaches to headswap can result in less disruption. For example, a headswap on a controller of an HA pair can involve a takeover of the replaced controller's storage devices by the system controller that is not being replaced. In this manner, the storage volumes and devices owned by the affected controller are taken over by the remaining controller and are at least available during the headswap process. A number of steps are manually performed to swap out the outgoing controller with a newly installed controller. After this swapping out of the old controller is finished, then a manual disk reassign operation is performed, and a giveback of the storage devices from the remaining system controller to the newly installed controller is provided.

Unfortunately, there are several problems that can arise from such a non-disruptive but largely manual process. For example, headswap detection by an HA paired system often depends upon a controller detecting a discrepancy in ownership of an aggregate of storage devices (e.g., an array of storage devices) and the individual devices in the aggregate. Where such aggregate and individual device ownership discrepancies do not exist despite the existence of a headswap, the headswap may then go undetected, which can make headswap detection unreliable in some cases. In addition, a manual headswap procedure may rely upon an accurate input of the new controller system identifier by the user. If any error occurs in this manual system identifier entry process, then the headswap fails and the replacement controller may need to be entirely rebooted. Further, problems can arise when giveback from controller and storage operations are performed at the same time. Further, multidisk panic can occur when disks are reassigned while they are live because a controller may attempt to recover from unknown or inconsistent states that arise during live reassignment.

Although many network storage systems, devices and methods for headswap have generally worked well in the past, there is always a desire for improvement. In particular, what is desired are network storage systems and methods that are able to provide headswap procedures for system controllers in an automated, non-disruptive and reliable manner that overcomes the foregoing problems.

SUMMARY

It is an advantage of the present disclosure to provide improved systems and methods that facilitate better headswaps in network-based storage systems. Such improved systems and methods preferably are able to replace full system controllers and/or parts of system controllers, such as controller heads and Non-Volatile RAM (NVRAM) cards that include program information, in an HA pair in an automated, non-disruptive and reliable fashion. In the foregoing examples, full system controllers as well as controller parts are referred to as controllers for convenience. The disclosed embodiments involve a more automated headswap procedure where HA paired controllers exchange their system identifiers early in a boot or headswap process, such that the controllers are aware of a headswap process and act accordingly. In addition, giveback involves rapidly updating disk and RAID ownerships to reflect proper system identifiers, such that replacement controllers are able to boot up and integrate smoothly.

In various embodiments of the present disclosure, a network-based storage system includes a plurality of physical storage devices and a plurality of system controllers. The plurality of physical storage devices can include at least first and second aggregates of storage devices, wherein each storage device in the first and second aggregates of storage devices includes an ownership portion thereupon that is configured to indicate a system controller to which it belongs. The plurality of system controllers can include at least first and second system controllers that are each in communication with each other, the plurality of storage devices, and a separate host server. Each of the plurality of system controllers can be adapted for controlling a respective aggregate of storage devices and for reading and writing to the plurality of storage devices based upon commands received from another system controller or the separate host server. Further, the first system controller can be adapted to control the first aggregate of storage devices and can be configured to facilitate an automated hotswap replacement of the second system controller that originally controls the second aggregate of storage devices with a separate third system controller that subsequently controls the second aggregate of storage devices. The first system controller can be further adapted to take over control of the second aggregate of storage devices during the automated hotswap replacement of the second system controller, and can also be further adapted to exchange system identifiers and ownership portion information with the separate third system controller automatically during the automated hotswap replacement.

In various other embodiments, a network-based storage system controller adapted to operate in a redundant storage array environment can include a plurality of modules. A first module can be adapted to control reading and writing to each of a first plurality of storage devices arranged into a first aggregate based upon commands received from another system controller or a separate host server. A second module can be adapted to facilitate interactions with a separate second controller in a high availability pair arrangement, wherein the separate second controller controls reading and writing to each of a second plurality of storage devices arranged into a second aggregate based upon commands received from another system controller or the separate host server. A third module can be adapted to facilitate an automated hotswap replacement of the separate second controller with a separate third controller that subsequently operates the second aggregate by taking over control of the second aggregate during the automated hotswap replacement of the separate second controller, wherein at least one of the second or third modules is further adapted to inform the separate third controller of the automated hotswap replacement by exchanging system identifiers with the separate third controller automatically during the automated hotswap replacement of the separate second controller with the separate third controller.

In still further embodiments, a non-disruptive method of replacing a controller in a network-based storage system can include steps such as detecting an existence of an automated hotswap replacement procedure on a replacement controller, detecting an existence of the automated hotswap replacement procedure on an original system controller, wherein the original system controller and the replacement controller are configured to operate as a high availability pair of controllers, updating a first ownership portion on each storage device in an aggregate of storage devices to reflect that each storage device in the aggregate of storage devices is owned by the replacement controller, booting up the replacement controller, and updating a second ownership portion on each storage device in the aggregate of storage devices to match the updated first ownership portion on each respective storage device.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive devices, systems and methods that facilitate a non-disruptive controller replacement in a network-based storage system. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

The examples herein refer to disks, though the scope of embodiments is not limited to devices that include Hard Disk Drives (HDDs). Rather, various embodiments include any appropriate storage device now known or later developed, including, e.g., Solid State Drives (SDDs) and the like.

The present disclosure relates in various embodiments to devices, systems and methods that facilitate a non-disruptive controller replacement in a network-based storage system. Such devices, systems and methods preferably are able to replace controllers in an HA pair in an automated, non-disruptive and reliable fashion. In various particular embodiments, a more automated headswap procedure involves HA paired controllers exchanging or providing their system identifiers early in a boot or headswap process, such that the controllers are aware of a headswap process and act accordingly. In addition, giveback to new replacement controllers can involve rapidly updating disk and RAID ownerships to reflect proper system identifiers, such that the replacement controllers are able to boot up and integrate smoothly. While the various examples disclosed herein focus on particular aspects of headswap within an HA pair, it will be understood that the various principles and embodiments disclosed herein can be applied to other controller arrangements in network-based storage applications and systems, as may be appropriate. Furthermore, while the disclosure often refers to disks, RAIDs, filers and other similar terms for disk based storage, it will be understood that the various principles and embodiments disclosed herein can be applied to other types of storage devices and systems as well.

Figure 1:
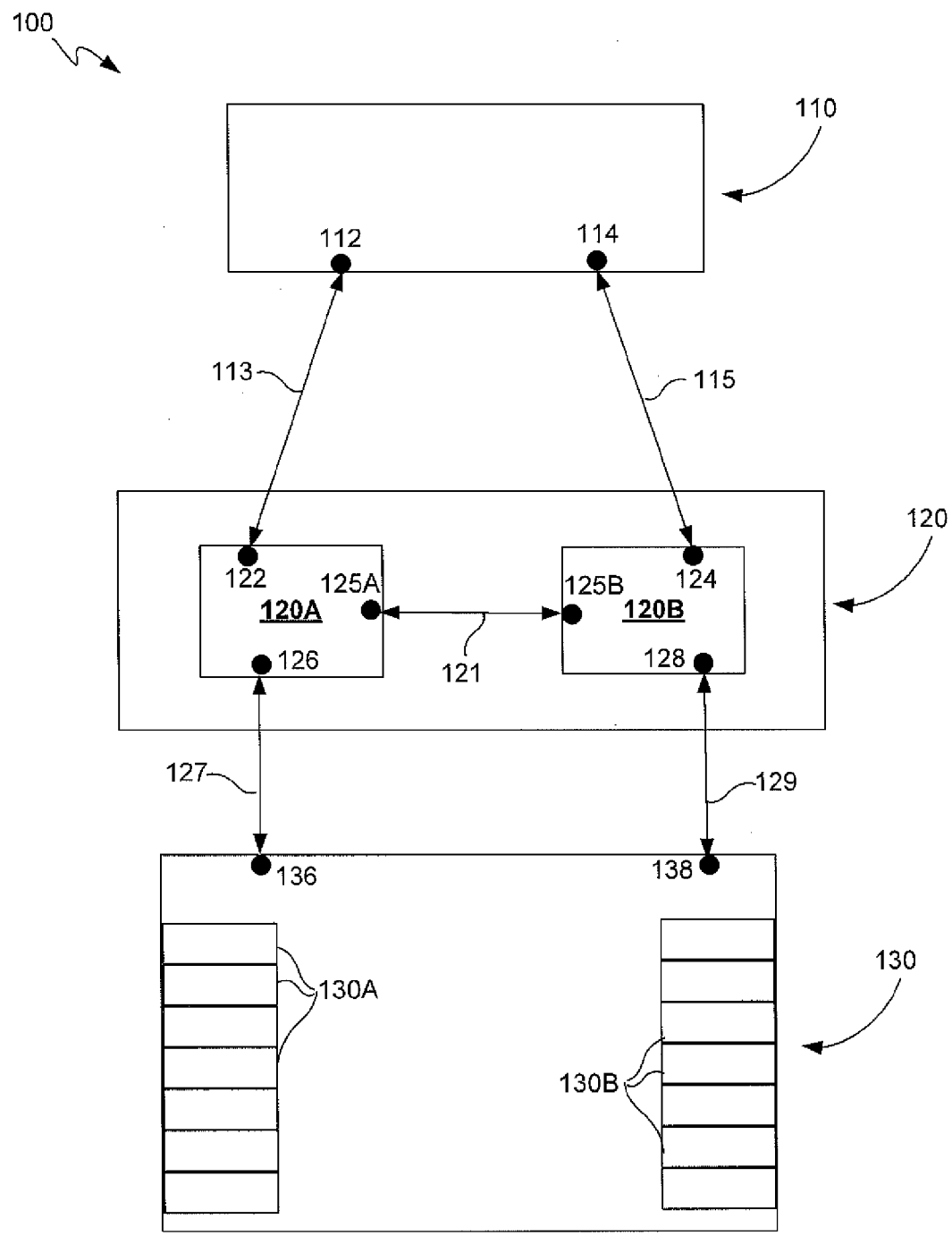
FIG. 1 illustrates in block diagram format an exemplary network-based storage system having an HA controller pair and a plurality of storage devices according to one embodiment of the present invention.

Beginning with FIG. 1, an exemplary network-based storage system having an HA controller pair and a plurality of storage devices is shown in block diagram format. System 100 can include a host or server 110 having a plurality of ports 112, 114 that facilitate communications along links 113, 115 to a plurality of controllers 120. Controllers 120 can include an HA pair of controllers 120A, 120B having ports 122, 124 to facilitate communications with the host 100, as well as additional ports 126, 128 to facilitate communications along links 127, 129 to ports 136, 138 on storage devices 130. An internal connection or link 121 can facilitate communication between ports 125A, 125B of HA controllers 120A, 120B. Storage devices 130 can be arranged into an aggregate (i.e., grouping of devices that work together, where a RAID is an example of an aggregate) that is controlled by HA controller pair 120, and can include a number of storage devices or volumes 130A, 130B. For example, storage devices 130 can include a number of physical disks arranged into one or more RAIDs that can be stored on one or more storage filers. HA controller 120A can be designated as the owner or controller of a set of storage devices or volumes 130A, while HA controller 120B can be designated as the owner or controller of a separate set of storage devices or volumes 130B. Other features and details relevant to a controller and storage device arrangement for an HA controller pair may also be included, as will be readily appreciated.

Figure 2:
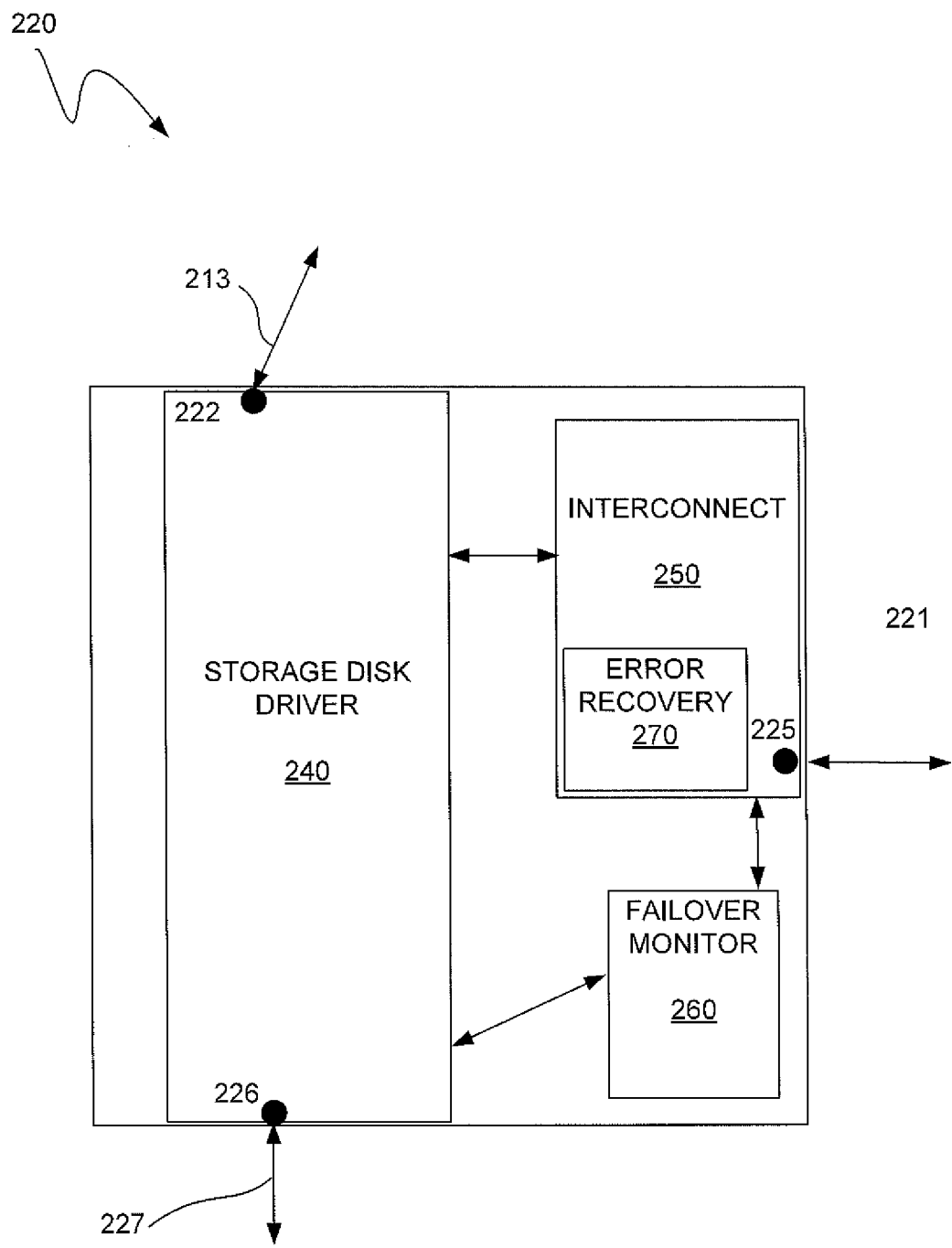
FIG. 2 illustrates in block diagram format an exemplary HA controller having a plurality of modules according to one embodiment of the present invention.

Continuing next to FIG. 2, an exemplary HA controller having a plurality of modules is similarly illustrated in block diagram format. Controller 220 can be part of an HA pair, such as the HA pair set forth above in FIG. 1. A plurality of ports and links can couple controller 220 to a number of other system components. For example, a port 225 and associated link 221 can couple to a separate partner or paired HA controller, a port 222 and associated link 213 can couple to a separate host, and a port 226 and associated link 227 can couple to a separate storage array or aggregate of storage devices. One or more software modules within HA controller 220 can facilitate a number of functions, including those associated with a non-disruptive and automated headswap procedure. Although a wide variety of possible modules and different numbers of modules can be used, one general example using four modules is provided here for purposes of discussion. It will be readily appreciated that fewer or more modules can be used, that other functionalities can be added, and that the specified functionalities can be combined into and/or shared across different modules.

Each of modules 240, 250, 260, 270 can be adapted to communicate or interact with other modules and/or various separate system components as may be appropriate. For example, a first module 240, which can be known as a "Storage Disk Driver," can represent a network and storage protocol stack for any Input/Output (IO) that goes to the storage devices. Storage Disk Driver 240 can be adapted to control the reading and writing to each of a first plurality of storage devices based upon commands received from one of the other modules, another controller, or a separate server or host. A second module 250, which can be known as an "Interconnect," can be adapted to facilitate interactions with a separate second controller in an HA pair arrangement. Such interactions can include, for example, mirroring of data across controllers to facilitate takeover, monitoring the health of each controller, and exchanging system identifiers across controllers, among other possible interactions. Again, the separate second controller can be adapted to control the reading and writing to each of a second plurality of storage devices based upon commands received from another module, another controller, or the separate host server.

A third module 260, which can be known as a "Failover Monitor," can be adapted to facilitate an automated hotswap replacement of the separate second controller with a separate third controller that subsequently takes over and controls operation of the second plurality of storage devices. A headswap can be determined automatically when the system identifier received via the Interconnect module 250 from a separate controller is different from that which was previously received. In other words, a different system identifier is an indication of a different second controller in communication over link 221. After a replacement controller has been detected, an automated hotswap can then be initiated by controller 220. A hotswap is generally the replacement of a computer system controller or other component with a similar controller or component while the computer system remains in operation, such that there is little to no significant interruption in system operations during the replacement. This particular hotswap is accomplished at least in part by the Failover Monitor module 260 taking over control of the second plurality of storage devices during the automated hotswap replacement of the separate second controller with the separate replacement third controller. Furthermore, at least one of the Interconnect or Failover Monitor modules 250, 260 can also be adapted to exchange system identifiers with the separate third controller automatically during the automated hotswap replacement.

A fourth module 270, which can be known as "Error Recovery," can be adapted to facilitate aborting the automated hotswap replacement and reverting control of the failed (second) controller's aggregates or volumes of storage units back to the first system controller when the separate third controller fails during the automated hotswap. Again, and as will be readily appreciated, it is not necessary for all of the foregoing modules to exist separately. For example, the Error Recovery functionality of fourth module 270 can be distributed across one or more of modules 240, 250, and 260, such that an actual fourth module 270 is not implemented on controller 220. As shown, Error Recovery 270 can be entirely within Interconnect module 250, although other arrangements are certainly possible.

As will be appreciated, a typical network-based storage system having an HA controller pair generally operates by writing a "nvram_system_ID" or another suitable system identifier of the appropriate controller to an ownership portion or region of a disk when that disk is assigned to a controller. Such an ownership portion or region of a disk can be referred to specifically in any number of suitable ways, but will be referred to herein as the "SANOWN" region or portion of the disk for purposes of discussion. This system identifying and writing process can be conducted for each assigned disk in an aggregate, which can help to establish a mapping as to which controller owns a particular disk. Disk ownership information can also be cached in a RAID label at a separate region on each disk for identifying which controller is the owner of an aggregate of disks. Thus, each disk has a portion of space set aside for a SANOWN label and another portion set aside for an aggregate label, such as a RAID ownership label. SANOWN ownership thus generally refers to the ownership of an individual disk, while RAID ownership generally refers to the ownership of an aggregate of disks, each of which should have a SANOWN ownership to the same controller. As such, whenever the controller gets replaced in a headswap operation, then these on-disk SANOWN and RAID labels also change to reflect the headswap.

One typical approach for doing a headswap is to first manually boot the replacement controller into a maintenance mode. This is usually done because the system identifier for the new controller is different than the device identifier that is stored on the disks in a SANOWN label, such that the replaced controller cannot effectively boot up in ordinary operations. While the replacement controller and new controller are in a maintenance mode and offline, a disk reassign operation can then be run by the new controller to fetch a list of disks that are owned by the old replaced controller and then manually change the SANOWN in each one of the disks to reflect the identifier of the new controller. As noted above though, this process is disruptive in that the storage of the affected disks is unavailable during the whole procedure.

Such a disruption can be avoided, for example, by having the other controller in an HA pair takeover the storage devices or volumes owned by the outgoing (failed) controller that is being replaced. For example, where an HA pair of controllers includes controllers A and B, and controller B is to be replaced by a new controller C, then A can perform a takeover of the storage owned by B while B is being replaced by C. A manual disk reassign from B to C is then performed on A while A is in control of the subject storage, after which a giveback is performed from A to C. As noted above though, this process can give rise to its own sets of problems, such as a need for significant manual intervention, and an increased chance of instigating a multidisk panic when an error occurs during manual identifier entry while disks being reassigned are active.

As mentioned above, each disk has a SANOWN portion that indicates disk ownership and an aggregate or RAID portion that indicates ownership for an aggregate of multiple disks. A protocol has evolved to deal with ownership inconsistencies between RAID and SANOWN. Whenever the ownership of a disk changes, controller A can emulate fake SANOWN deletion and addition events for that disk and also send notification to logic responsible for RAID ownership, which upon receiving such notification takes appropriate actions. The protocol typically requires that disks belonging to an aggregate be owned by the same controller. If the disk ownership of one of these disk changes, then that disk is removed from the aggregate. In some sequences, a disk reassign can cause the ownership of the partner disks within a given aggregate to change from B to C, which in turn generates delete and addition events for the disks, even including those which are part of aggregates. The disk ownership problem can cause logic responsible for RAID ownership to assume that the aggregate has lost its disks, and can result in a panic on A, which can then result in even more disruption than the original basic process.

While this particular disk ownership problem can be avoided by not sending notifications during the disk reassign process, such a workaround puts the system into a substantially or entirely inconsistent state where the SANOWN and RAID ownership values are different. This inconsistent state can be unstable, in that any operation that triggers an internal rescan by logic responsible for RAID ownership will then result in a system panic as the different ownership values are then realized. In addition, the foregoing workaround also requires a significant amount of manual intervention, such as a user manually entering the system identifier of the new controller. While inconvenient, such a process is also prone to user error in the mis-entry of the new system identifier, which would then result in a failure during an attempted headswap process. In any event, better headswap approaches that are more automated, reliable and non-disruptive are preferable.

Improved approaches can continue to cache the ownership at a RAID layer, while orchestrating ownership inconsistencies in an improved fashion. These approaches can generally be characterized by: 1) exchanging system identifiers early in the headswap process, 2) updating ownerships when the aggregates are offline, 3) the ability of a controller to deal with transient condition where there are two partners, and 4) more reliable error recovery mechanisms. As a particular example, an improved headswap process can involve a controller failover ("CFO"), a storage failover ("SFO"), or both, and can include five generally ordered parts or procedures:
  Headswap Detection on Controller C;
  Headswap Detection on Controller A;
  Ownership Updates During CFO Giveback;
  Boot Sequence of Controller C After CFO Giveback; and
  Ownership Updates During SFO Giveback,
These steps reflect a system where controllers "A" and "B" form an HA pair, and where system controller "B" is being replaced by a new or replacement system controller "C" that will then pair with "A" to form a new HA pair. This example further assumes that controller "B" is disabled and/or removed and is not in communication with either "A" or "C".

The above general procedure "Headswap Detection on Controller C," effectively amounts to detecting the existence of an automated hotswap replacement procedure on a replacement controller. In particular, newly installed system controller C boots up and consults the SANOWN labels of the disks to see if there are any disks connected to controller C which are owned by controller C. Under the improved headswap procedure, controller C checks for the state of its HA partner controller (i.e., controller A) before making a decision on its boot process. For example, in response to an inquiry by controller C, controller A can provide its state via the interconnect 221 so that controller C can determine whether controller A (i.e., its HA partner) is in takeover mode. If the interconnect 221 is down, or if controller A is not in takeover mode, then controller C reboots.

If controller A is determined to be in takeover mode, then controller C goes into a "waiting for giveback" state and does not reboot. Controller C saves a flag, identifier, indicator or other suitable information to itself locally to indicate a headswap is ongoing. While waiting for giveback from controller A, new controller C continues to send its system identifier to controller A via the interconnect link 221. During this time, controller A can send a system identifier to controller C that indicates which controller was the HA partner controller to A prior to the takeover by A. In the event that this system identifier sent by controller A does not match the system identifier of controller C, then controller C is able to determine that it is a replacement controller for controller B and that a headswap procedure is underway.

The above general procedure "Headswap Detection on Controller A," effectively amounts to detecting the existence of the automated hotswap replacement procedure on an original system controller. Controller A repeatedly polls for the state of its HA partner controller over the interconnect link 221 while controller A is in takeover mode. As such, controller A reads or polls the state of controller C via the interconnect link 221 and determines whether controller C (i.e., its HA partner) is in the "waiting for giveback" mode. If the HA partner to controller A (i.e., controller C in this case) is determined to be in a "waiting for giveback" mode or state, and if that HA partner sends a system identifier that does not match the identifier for the original HA partner (i.e., old controller B), then controller A is able to determine that its current HA partner controller is a replacement controller and that a headswap procedure is underway.

Accordingly, pursuant to the Headswap Detection on Controller C operation and the Headswap detection on Controller A operation, the controllers A and C inform each other of the headswap procedure by exchanging system identifications.

Subsequently, controller A initiates a giveback procedure while new controller C is in its "waiting for giveback" mode or state. The giveback procedure is designed to take the storage devices or volumes that were originally owned by the replaced or failed controller B and taken over by controller A, and give them to controller C. This giveback procedure can be divided into two phases. First, a CFO phase giveback can involve CFO aggregates being taken offline from controller A and then given to controller C, after which controller C boots up. After controller C has booted, a subsequent SFO phase giveback can involve SFO aggregates being taken offline from controller A and then given to controller C.

As may be readily appreciated, a given system can have CFO aggregates, SFO aggregates, or both, with the relevant details provided herein for either type not applying in the event that the given system does not have one of these aggregate types. The difference between CFO and SFO aggregates merely reflects which designations are relevant or useful depending upon system or user requirements. CFO and SFO aggregates are arbitrary designations for aggregates created by different systems with different characteristics and requirements. A particular system may create one or both of CFO and SFO aggregates. For instance, a system designed to protect against system fail over would be designed with SFO aggregates in mind. Similarly, a system designed to protect against controller fail over would be designed with CFO aggregates in mind. For the purposes of the following examples, CFO and SFO aggregates are treated differently in how disk ownership is stored and modified in a takeover and headswap and in how the aggregates are given back in takeover mode.

Again, the term "aggregates" merely reflects designated groupings of disks owned by a specific controller, and it can involve convenient terminology to call these disk groupings CFO and/or SFO aggregates depending upon whether the relevant system is adapted to perform CFO operations, SFO operations, or both.

With respect to the above general procedure "Ownership Updates During CFO Giveback," controller A takes offline the CFO aggregates that were owned by B to initiate a giveback process. Controller A changes the SANOWN ownership of the CFO aggregate disks from B to C, and updates the HA partner system identifier on itself (i.e., controller A) to controller C. Controller A retains a stored value of the old controller B system identifier in case controller C fails during giveback, thereby allowing controller A to change disk ownership back to B.

As controller C boots, controller C becomes aware via communications with controller A that it is in a local headswap state. With respect to the above general procedure "Boot Sequence of Controller C After CFO Giveback," controller C checks the SANOWN region of disks within the storage device 130 to find disks having ownership values that reflect the system identifier of controller C after its HA partner (i.e., controller A) moves out of takeover mode. Controller C continues to find such disks until no more are discovered. During boot up while the local headswap process is underway, controller C updates the RAID ownerships to its system identifier. After this is complete, the affected storage devices or volumes can be brought back online and the boot up of controller C can continue. Once controller C boots up completely, then it is ready to receive any SFO aggregate disks that may be applicable.

Finally, with respect to the above general procedure "Ownership Updates During SFO Giveback," an SFO giveback is triggered once controller C boots up completely. This can involve controller A taking offline the SFO aggregates previously owned by controller B one by one, and updating the SANOWN and RAID ownerships of the disks in the SFO aggregates to C. After controller A has performed a giveback of the of the SFO aggregates to its new HA partner controller C, controller A deletes from itself the system identifier associated with old partner controller B, which can be stored at, for example, internal RAM of the controller, a storage buffer area, or other suitable location. Controller C deletes the local headswap information on itself, and headswap is complete.

Controller A can be a typical HA paired controller in many ways. Referring again to FIG. 2, a given controller 220, such as controller A, can include a Storage Disk Driver module 240 that controls the reading and writing to each of a first plurality of storage devices arranged into a first aggregate, and also Interconnect module 250 adapted to facilitate interactions with a separate second controller in a high availability pair arrangement. A Failover Monitor module 260 on controller A can be adapted to facilitate the automated hotswap replacement of the separate second controller with a separate third controller by taking over control of the second plurality of storage devices during the automated hotswap replacement of the separate second controller, as set forth above.

Various advantages of this improved headswap procedure can be realized. One advantage provides for most or substantially all of the headswap procedure to be automated, which can reduce or eliminate manual user intervention and the possible errors that can arise from such activities. This can be facilitated at least in part due to the early exchange of system identifiers between HA controllers in the headswap process. In addition, disk ownership changes are performed when the storage objects or aggregates are briefly offline, which minimizes errors while improving data reliability. Another advantage provides for both the old and new controller system identifiers to be more reliably remembered in the system, which permits improved error recovery in that failures on either controller during a headswap procedure can be handled more seamlessly. Specifically, in various embodiments, both the old and new system identifiers can be stored in at least one controller (e.g., in internal RAM) each so that if one controller stops functioning the other controller has relevant system identifiers to continue functioning.

Error recovery can ensure that failure on either controller during a headswap procedure does not result in permanent data outage. Suitable protocols or rules for such error recovery can involve, for example, controller C failing after CFO giveback but before headswap is complete. In these situations, controller A can again perform a takeover of the affected storage devices and revert the SANOWN/RAID ownerships back to a consistent state. The consistent state would involve bringing the ownerships back to B, and data again being served by controller A. Controller A also deletes any references to controller C. At some later time then, controller C or another replacement controller can be installed and booted up, upon which a fresh headswap cycle would take place. With respect to controller A, error recovery can be controlled by, for example, an Error Recovery module 270 that is adapted to facilitate aborting the automated hotswap replacement and reverting control of the affected aggregates back to controller A when controller C fails during the automated hotswap.

As another error recovery example, controller A could possibly fail after CFO giveback but before headswap is completed. In such situations, new controller C could then take over. Since controller C has to deal with only one partner (i.e. controller A), as part of the takeover controller C does the ownership cleanup (i.e. changing disk ownerships from B to C) for the remaining aggregates that were previously owned by old controller B. Controller C may also take over the disks assigned to A until a replacement for A is installed. Controller C also deletes local headswap information (e.g., its headswap state, the state of controller A, any identifiers relating to controller B) on itself, and the headswap is then complete.

Figure 3A:
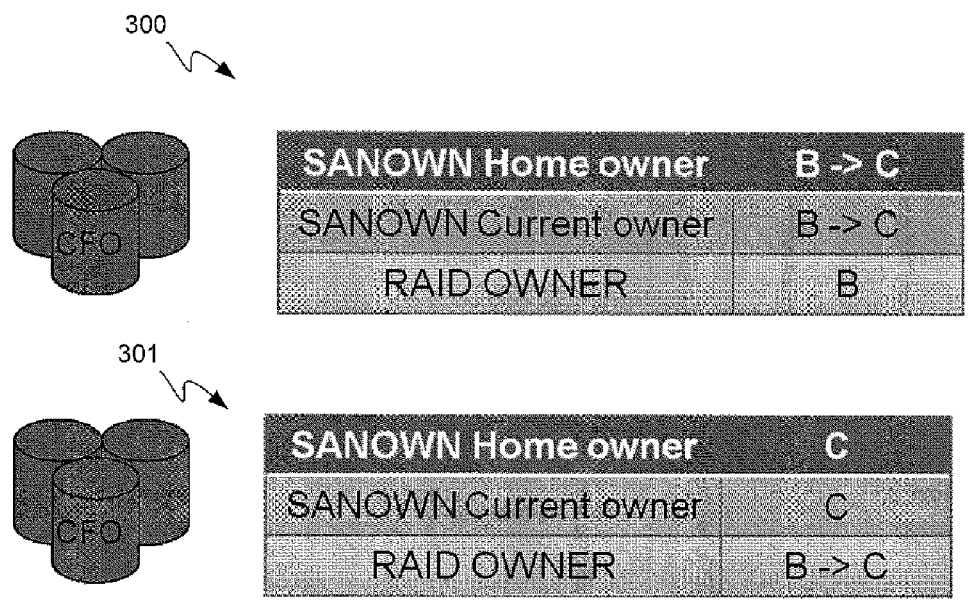
FIGS. 3A-3B illustrate in block diagram and table formats an exemplary alternative progression of ownership designations for storage devices subject to an HA controller pair undergoing headswap according to an alternative embodiment of the present invention.
Figure 3B:
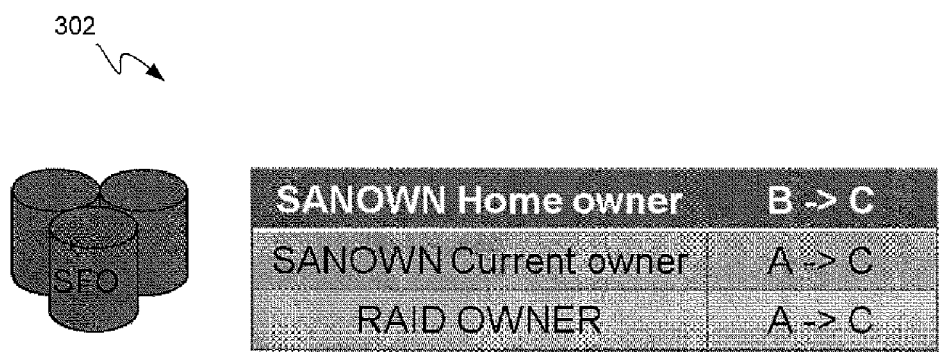

FIGS. 3A-B are provided to illustrate a particular example of changing SANOWN and RAID ownership during the takeover and giveback operations described above. However, the scope of embodiments is not limited to the techniques shown in FIGS. 3A-B, as any appropriate technique to change ownership may be used. FIGS. 3A-B show SANOWN Home owner, SANOWN Current owner, and CFO and SFO ownership designations. In general, the "home owner" of a given disk is the controller that is designated permanent or long-term owner of the disk, while the "current owner" is the controller that is presently operating the disk, which can be the home owner or another controller that is temporarily operating the disk. A RAID owner is the designated owner for a collection or aggregate of disks, each of which has its own SANOWN. SFO and CFO ownership designations, as well as home and current designations for SANOWN are types of SANOWN and RAID ownership labels; they are stored in the space on the disks reserved for SANOWN and RAID described above.

Continuing now with FIGS. 3A-3B an exemplary progression of ownership designations for storage devices subject to an HA controller pair undergoing headswap according to one embodiment is shown in block diagram and table formats. FIG. 3A provides a progression of arrangements 300, 301 involving the changes in SANOWN and RAID ownerships in an improved giveback procedure. Arrangement 300 depicts what happens during giveback by controller A, while arrangement 301 depicts what happens during boot up on controller C. As shown during the giveback by controller A in arrangement 300, the SANOWN home and current owner are changed from B to C. It should be appreciated that while A is temporarily controlling the disks of B during the headswap, the controller designations are changed from B directly to C, so as to more readily facilitate reaching the end result of the headswap process where those designations are to be C. Again, this happens where controller A takes offline the CFO aggregates that were owned by controller B, changes the SANOWN ownership of the CFO aggregate disks from B to C, and updates its own HA partner system identifier on itself to controller C. During the subsequent boot up on controller C, as shown in arrangement 301, the SANOWN home and current owner remain at C, and the RAID owner is changed from B to C. Further details regarding depicted arrangements 300 and 301 are set forth above in the generally ordered procedures involving "Ownership Updates During CFO Giveback" and "Boot Sequence of Controller C After CFO Giveback." FIG. 3B then depicts an arrangement 302 where the SFO aggregates are given back after controller C fully boots up. As shown, the SANOWN and RAID ownerships are each changed to reflect C. As will be readily appreciated due the storage failover context, if applicable, these SFO changes are made from designations that reflect the actual home owner, current owner and RAID owner situations after an initial takeover process of B's disks by A (i.e., B, A and A), rather than the foregoing CFO process of FIG. 3A that is able to shortcut and avoid any temporary designations to A. Further details regarding arrangement 302 are set forth above in the generally ordered procedure involving "Ownership Updates During SFO Giveback."

Figure 4:
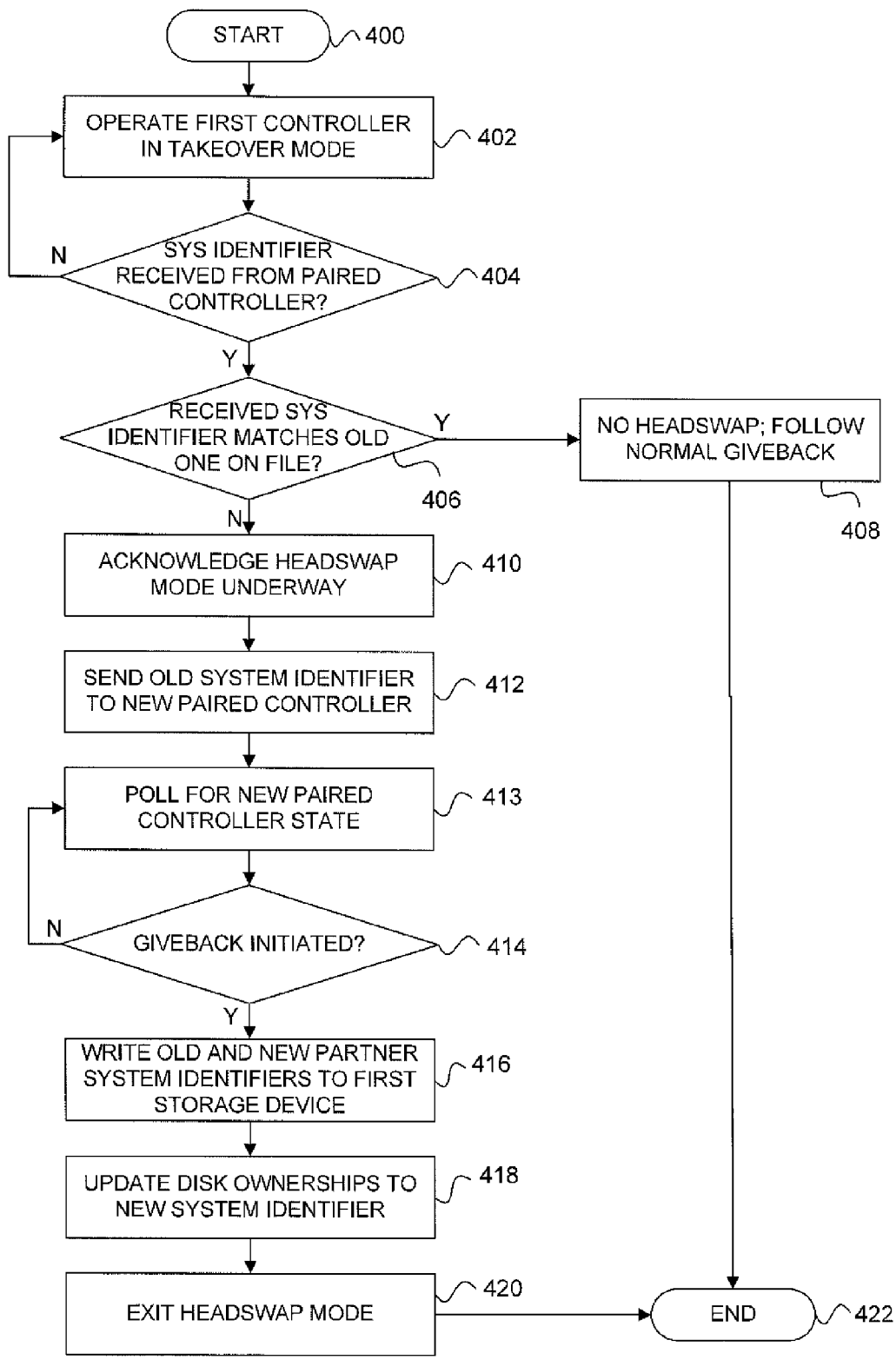
FIG. 4 provides a flowchart of an exemplary non-disruptive method of replacing a controller in a network-based storage system from the perspective of the remaining controller in an affected HA pair according to one embodiment of the present invention.
Figure 5:
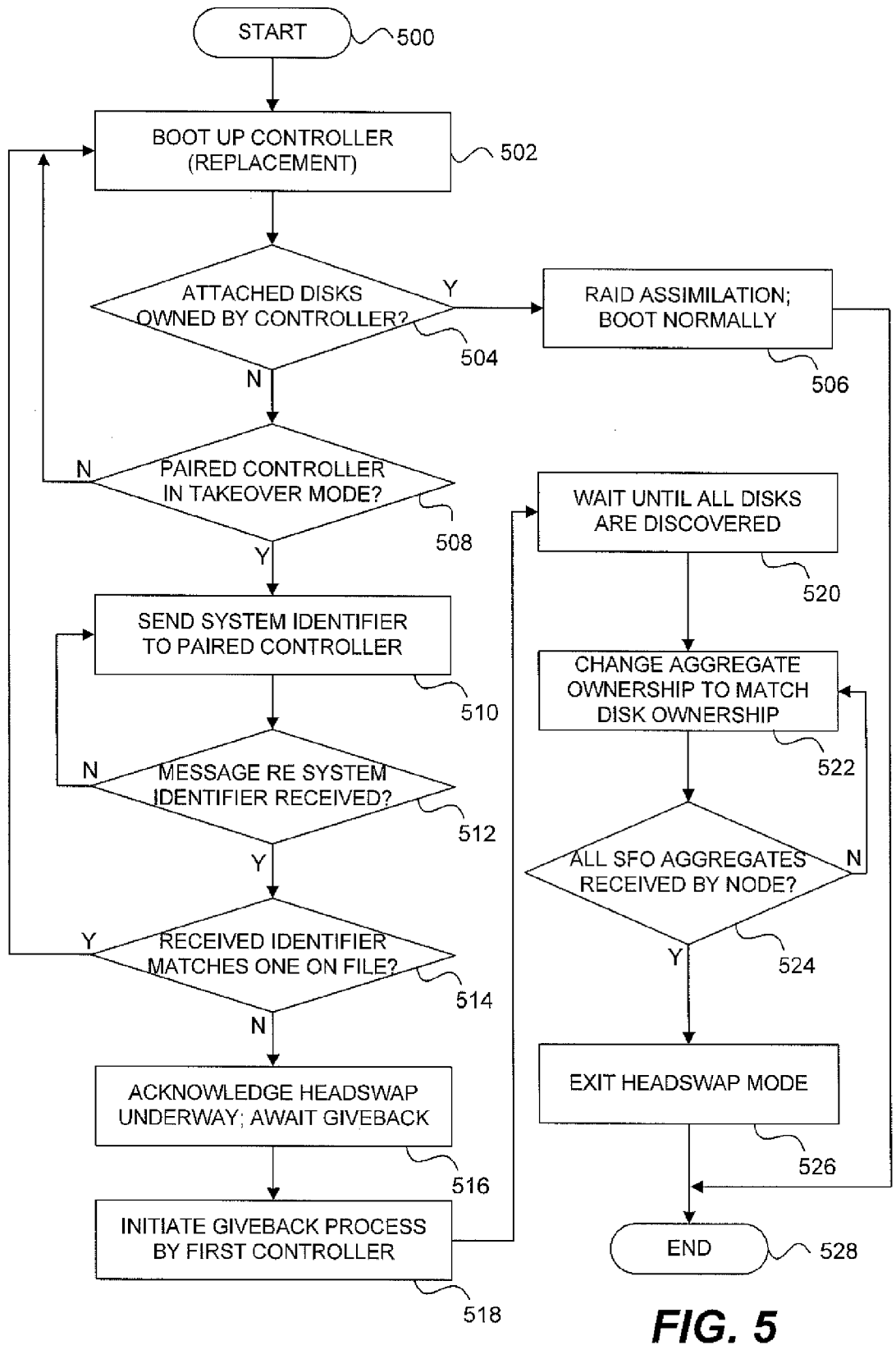
FIG. 5 provides a flowchart of an exemplary non-disruptive method of replacing a controller in a network-based storage system from the perspective of the new controller according to one embodiment of the present invention.
Figure 6:
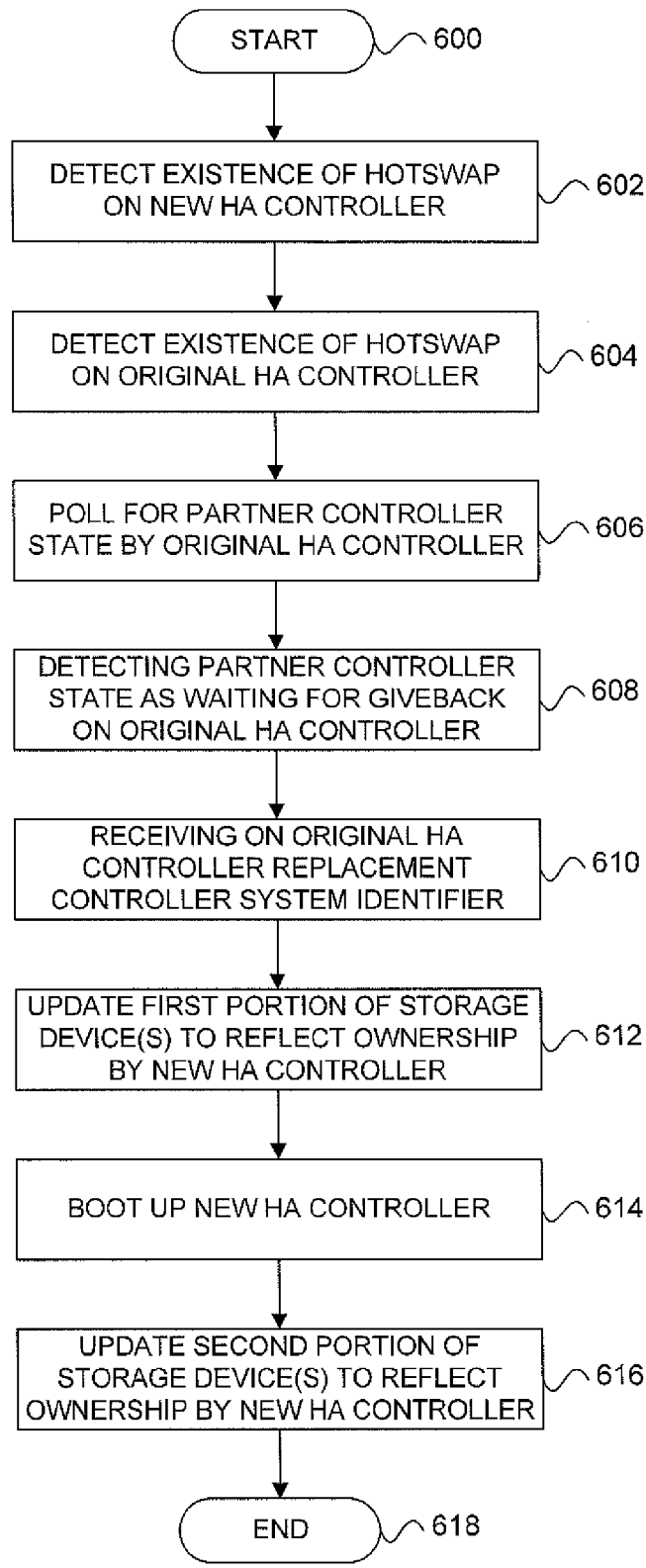
FIG. 6 provides a flowchart of an exemplary non-disruptive overall method of replacing a controller in a network-based storage system according to one embodiment of the present invention.

Turning now to FIGS. 4-6, various methods of performing a headswap according to the foregoing improved processes and features are provided. First, FIG. 4 provides a flowchart of an exemplary non-disruptive method of replacing a controller in a network-based storage system from the perspective of the remaining controller in an affected HA pair. In particular, such a method can involve the use of any of the various networks, systems, controllers, storage devices and various features thereof that are provided in detail above. Further, it will be readily appreciated that not every method step set forth in this flowchart is always necessary, and that further steps not set forth herein may also be included. Furthermore, the order of steps can be rearranged in some embodiments where suitable. For example, step 410 might take place after or simultaneously with step 412 in some cases.

Beginning with a start step 400, a first controller in an HA pair operates in a takeover mode at process step 402. At a following decision step 404, an inquiry is made as to whether a system identifier has been received from the partner controller from the HA pair to which the first controller belongs. If not, then the method reverts back to process step 402, where the first controller continues to operate in takeover mode. When a system identifier from the paired controller is received at step 404, the method continues to decision step 406, where an inquiry is made as to whether the received system identifier matches the partner system identifier that is already on file with the first system controller. If the system identifier matches, then the method moves to process step 408, where it is determined that no headswap is taking place, and a normal giveback procedure to the old HA paired controller takes place. The method then moves from step 408 to end step 422.

Where the received system identifier does not match the one that is already on file at decision step 406, the method continues to process step 410, where it is acknowledged or "detected" that a headswap process or mode is underway. At process step 412, the system identifier from the old replaced controller is sent to the new controller, after which the first controller polls the new controller for its state in anticipation of receiving a giveback state at process step 413. An inquiry is then made at decision step 414 as to whether a giveback state has been polled or returned, whereby a giveback procedure has thus been initiated. If not, then the method loops back to step 413 until the giveback is in fact initiated. After giveback is initiated, the method moves to process step 416, where the system identifier for the new controller is written to an entry on the first controller to designate locally within the first controller the identity of its new partner. Then the first controller updates the affected disk ownerships of the new system identifier at process step 418. The state of the first controller is appropriately updated to reflect the presence of the new controller and the status of the new controller as having taken a giveback of the disks or volumes that were previously owned by the old replaced controller. Headswap mode is exited at process step 420, upon which normal operations of the HA controller pair and their respectively controlled volumes takes place. The method then ends at end step 422.

Next, FIG. 5 provides a flowchart of an exemplary non-disruptive method of replacing a controller in a network-based storage system from the perspective of the new controller that is added to an HA pair to replace, e.g., a failed controller. Again, this method can involve the use of any of the various networks, systems, controllers, storage devices and various features thereof that are provided in detail above, and it will be readily appreciated that not every step set forth is always necessary, that further steps may also be included, and that the order of steps can be rearranged in some embodiments where suitable. Beginning with a start step 500, a new or replacement controller begins to boot up at its new location at process step 502. Early in the boot process, an inquiry is made at decision step 504 as to whether there are any disks connected to the new controller that are in fact owned by the new controller. If so, then the method moves to process step 506, where RAID assimilation and normal boot processes take place. No takeover or giveback occurs at this point, and the method then moves from step 506 to end step 528.

In the event that there are in fact no disks owned by the controller at decision step 504, the method continues to decision step 508, where an inquiry is made as to whether the HA paired partner controller is in takeover mode. If not, then the method reverts back to process step 502, and steps 502 through 504 are repeated. When it is determined that the partner controller is in takeover mode at decision step 508, the method moves on to process step 510, where the new controller sends its system identifier to the paired partner controller. An inquiry at step 512 is then made as to whether a system identifier is received back from the partner controller in response. If not, then the method loops back to process step 510 until a system identifier is in fact received back from the partner controller. Again, this system identifier from the partner controller represents the system identifier for the (failed) controller that was previously paired with the partner controller.

After the system identifier is received at step 512, an inquiry is made at the following decision step 514 as to whether the received system identifier matches the system identifier for the booting up controller. If the system identifiers do match, then the booting up controller realizes that it is the original partner controller, no headswap is taking place, and the method reverts back to process step 502. If the system identifiers do not match, the method proceeds to process step 516, where it is acknowledged or "detected" that a headswap is underway. A giveback process from the partner controller is initiated at subsequent process step 518, and the method moves on to process step 520, where the disks are discovered. At the following process step 522, the aggregate ownership is changed to match the disk ownership, after which an inquiry is made at decision step 524 as to whether the SFO aggregates have been received by the new controller. If not, then the process reverts to step 522 or otherwise waits until this takes place. After the SFO aggregates have been received by the controller at step 524, then the headswap is complete and headswap mode is exited at process step 526. The method ends at end step 528.

Referring to FIG. 6, a flowchart of an exemplary non-disruptive overall method of replacing a controller in a network-based storage system is provided. In particular, such a method can involve using or operating any of the various network-based storage system controllers or other components described above. Again, it will be readily appreciated that not every method step set forth in this flowchart is always necessary, and that further steps not set forth herein may also be included. Further, the exact order of steps may be altered as desired for various applications. For example, steps 602 and 604 can be reversed or performed at the same time.

Beginning with a start step 600, the existence of a headswap or system controller hotswap is detected on a newly introduced (e.g., replacement) HA paired controller at process step 602. The existence of the headswap or hotswap is also detected on an original HA paired controller at process step 604, after which the original controller polls the newly introduced pal ter controller for its state at process step 606. The original controller can continue polling at step 606 until the new partner controller is in or enters a "waiting for giveback" state. At the following process step 608 the original controller detects the state of the new partner controller as waiting for giveback, after which the original controller receives a system identifier for the new partner controller at process step 610.

At a subsequent process step 612, a first ownership portion such as, for example, the SANOWN-on each storage device in an aggregate of storage devices is updated by the original controller (e.g., controller A) to reflect that each storage device in the aggregate is now owned by the newly introduced or replacement controller. The newly introduced controller is then booted up at process step 614, after which a second ownership portion such as, for example, the RAID, —on each of the storage devices is updated by the newly introduced controller (e.g., controller C) to reflect ownership by the newly introduced controller at process step 616. Of course, other designations and ownership portions can be utilized rather than SANOWN as a first ownership portion and RAID as a second ownership portion. For example, the first ownership portion could be RAID, while the second ownership portion could be SANOWN. Further, other types and designations for ownerships may also be used, as will be readily appreciated. The method then proceeds to finish at end step 618. Further steps not depicted can include, for example, the original controller sending the identifier of the old replaced controller to the newly introduced controller, and/or determining whether received identifiers match stored identifiers before initiating a headswap or giveback process. Other method steps can include one or more of the foregoing steps from the methods shown in FIGS. 4 and 5, as may be desired.

The foregoing improved headswap procedure is non-disruptive, automated, and more reliable, which are due at least in part to the early exchange of system identifiers between HA paired controllers, the ability of both HA paired controllers to recognize that a headswap is underway, and the inability of a controller simply to reboot when a mismatch of identifiers or another problem arises.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A network-based storage system, comprising:
   A memory containing a non-transitory machine readable storage medium comprising machine executable code having stored thereon instructions for performing a method of controller replacement;
   A processor coupled to the memory, the processor configured to execute the machine executable code to cause the processor to:
   Receive system identifier data from a controller computing devise associated with a plurality of storage devices, wherein the received system identifier data indicates ownership over the plurality of storage devices;
   Compare the received system identifier data to parent system identifier data;
   Send the partner system identifier data to a second controller device when the comparison between the received system identifier data does not match the partner system identifier data;
   Poll the second controller computing device after sending the partner system identifier data, to determine when a giveback procedure has been initiated in the second controller computing device, wherein the giveback procedure comprises transferring ownership of the plurality of storage devices from the controller computing device to the second controller computing device; and Update a controller state with the received system identifier data after the giveback procedure has been initiated, wherein the updated controller state indicates ownership of the plurality of storage devices by the second controller computing device.

2. The device of claim 1, wherein the controller state is performed while the second controller computing device is in an online available state, wherein the second controller computing device is capable of receiving commands when in the online available state.

3. A non-transitory machine readable medium having stored thereon instructions for performing a method comprising machine executable code which when executed by at least one machine, causes the machine to:

receive system identifier data from a controller computing device associated with a plurality of storage devices, wherein the received system identifier data indicates ownership over the plurality of storage devices;

compare the received system identifier data to partner system identifier data;

send the partner system identifier data to a second controller computing device when the comparison between the received system identifier data and the partner system identifier data indicates that the received system identifier data does not match the partner system identifier data;

poll the second controller computing device, after sending the partner system identifier data, to determine when a giveback procedure has been initiated in the second controller computing device, wherein the giveback procedure comprises transferring ownership of the plurality of storage devices from the controller computing device to the second controller computing device; and update a controller state with the received system identifier data after the giveback procedure has been initiated, wherein the updated controller state indicates ownership of the plurality of storage devices by the replacement controller computing device.

4. The medium of claim 3, wherein the updating the controller state is performed while the second controller computing device is in an online available state, wherein the second controller computing device is capable of receiving commands when in the online available state.

5. A method comprising:

receiving, by a network storage computing device, system identifier data from a controller computing device associated with a plurality of storage devices, wherein the received system identifier indicates ownership over the plurality of storage devices;

comparing, by the network storage computing device, the received system identifier data to partner system identifier data;

sending, by the network storage computing device, the partner system identifier data to a second controller computing device when the comparison between the received system identifier data and the partner system identifier data indicates that the received system identifier data does not match the partner system identifier data;

polling, by the network storage computing device, the second controller computing device, after sending the partner system identifier data, to determine when a giveback procedure has been initiated in the second controller computing device, wherein the giveback procedure comprises transferring ownership of the plurality of storage devices from the controller computing device to the second controller computing device; and updating, by the network storage computing device, a controller state with the received system identifier data after the giveback procedure has been initiated, wherein the updated controller state indicates ownership of the plurality of storage devices by the second controller computing device.

6. The method of claim 5, further comprising:

obtaining, by the network storage computing device, a partner controller state from the second controller computing device, wherein the partner controller state comprises an indication that the giveback procedure has been initiated or that the second controller computing device is waiting for the giveback procedure.

7. The method of claim 5, wherein the updating the controller state is performed while the second controller computing device is in an online available state, wherein the second controller computing device is capable of receiving commands when in the online available state.

8. The method of claim 5, further comprising:

sending, by the network storage computing device, at least one inquiry for system identifier data to the second controller computing device when the system identifier data matches the partner system identifier data.

9. The method of claim 5, further comprising:

obtaining, by the network storage computing device, an acknowledgement from the second controller computing device after sending the system identifier data to the second controller computing device.

10. The method of claim 5, wherein the plurality of storage devices comprises storage ownership data to indicate ownership of the plurality of storage devices by the controller computing device and further comprising:

updating, by the network storage computing device, the storage ownership data in the plurality of storage devices to indicate that the plurality of storage devices are owned by the second controller computing device, wherein the storage ownership data comprises individual device data for each one of the plurality of storage devices or RAID (Redundant Array of Independent Disks) data for an aggregation of the plurality of storage devices.

11. The device of claim 1, wherein the processor is further configured to be capable of executing programmed instructions, which comprise the programmed instructions stored in the memory to:

obtain a partner controller state from the second controller computing device, wherein the partner controller state comprises an indication that the giveback procedure has been initiated or that the second controller computing device is waiting for the giveback procedure.

12. The device of claim 1, wherein the processor is further configured to be capable of executing programmed instructions, which comprise the programmed instructions stored in the memory to:

send at least one inquiry for system identifier data to the second controller computing device when the system identifier data matches the partner system identifier data.

13. The device of claim 1, wherein the processor is further configured to be capable of executing programmed instructions, which comprise the programmed instructions stored in the memory to:

obtain an acknowledgement from the second controller computing device after sending the system identifier data to the second controller computing device.

14. The device of claim 1, wherein the plurality of storage devices comprises storage ownership data to indicate ownership of the plurality of storage devices by the controller computing device and wherein the processor is further configured to be capable of executing programmed instructions, which comprise the programmed instructions stored in the memory to:

update the storage ownership data in the plurality of storage devices to indicate that the plurality of storage devices are owned by the second controller computing device, wherein the storage ownership data comprises individual device data for each one of the plurality of storage devices or RAID (Redundant Array of Independent Disks) data for an aggregation of the plurality of storage devices.

15. The medium of claim 3, further having stored thereon instructions for performing a method comprising machine executable code which when executed by at least one machine, causes the machine to:

obtain a partner controller state from the second controller computing device, wherein the partner controller state comprises an indication that the giveback procedure has been initiated or that the second controller computing device is waiting for the giveback procedure.

16. The medium of claim 3, further having stored thereon instructions for performing a method comprising machine executable code which when executed by at least one machine, causes the machine to:

send at least one inquiry for system identifier data to the second controller computing device when the system identifier data matches the partner system identifier data.

17. The medium of claim 3, further having stored thereon instructions for performing a method comprising machine executable code which when executed by at least one machine, causes the machine to:

obtain an acknowledgement from the second controller computing device after sending the system identifier data to the second controller computing device.

18. The medium of claim 3, wherein the plurality of storage devices comprises storage ownership data to indicate ownership of the plurality of storage devices by the controller computing device and further having stored thereon instructions for performing a method comprising machine executable code which when executed by at least one machine, causes the machine to:

update the storage ownership data in the plurality of storage devices to indicate that the plurality of storage devices are owned by the second controller computing device, wherein the storage ownership data comprises individual device data for each one of the plurality of storage devices or RAID (Redundant Array of Independent Disks) data for an aggregation of the plurality of storage devices.

\* \* \* \* \*